Jan. 23, 1923.
B. H. MANN.
TRAFFIC CHART AND METHOD OF CHARTING.
FILED MAR. 21, 1921.
1,443,233.
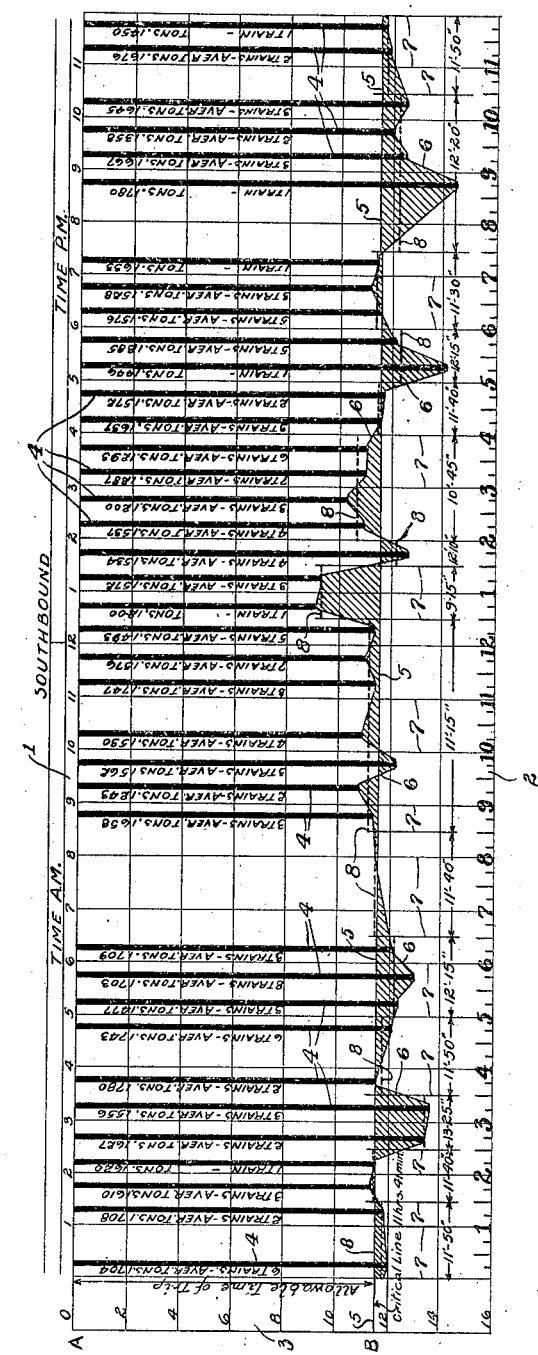
Inventor:
Bertram H. Mann
By Elliott Thurmer
Attorneys.

Patented Jan. 23, 1923.

1,443,233

UNITED STATES PATENT OFFICE.

BERTRAM H. MANN, OF ST. LOUIS, MISSOURI.

TRAFFIC CHART AND METHOD OF CHARTING.

Application filed March 21, 1921. Serial No. 453,896.

*To all whom it may concern:*

Be it known that I, BERTRAM H. MANN, a citizen of the United States, residing in the city of St. Louis and State of Missouri, have invented new and useful Improvements in Traffic Charts and Methods of Charting, of which the following is a specification.

This invention relates to a chart, and method of charting, the purpose of which is to represent graphically the traffic conditions existing on a railway line. While the invention is expected to be especially useful as applied to the study of freight traffic problems, it also affords means for studying passenger or other traffic conditions.

The general object of the invention is to provide a simple chart and method of charting which will indicate graphically the traffic conditions existing between points on a railway line or any other traffic way, throughout any predetermined time-period, for example, a day, with the idea that the chart will serve to indicate any desirable modifications in the traffic movements or in the method of operating trains, which would tend to bring about greater efficiency or economy.

The invention consists in the novel method and chart having the novel features to be described hereinafter, all of which contribute to effect a graphic representation of traffic conditions on a railway line or any other traffic way.

The drawing consists of one figure illustrating a chart embodying my invention.

My chart provides for the study of traffic problems of trains or traffic movements passing in one direction between two points. A second chart should be prepared corresponding to movements in the opposite direction between the points. In the present instance the chart is supposed to represent southbound traffic between two points, for example, from A to B.

In preparing such a chart, any desired time period may be selected, but in the present instance I have chosen a day; that is to say, twenty-four hours with twelve hours of ante-meridian time and twelve hours of post-meridian time.

In preparing the chart I provide a time scale 1 at the upper edge of the chart and a similar time scale 2, for convenience, at the lower edge of the chart. These time scales are divided into equal divisions corresponding to the hours of the day. In the drawing, the lower scale 2 is represented as divided into fifteen-minute periods. These clock-time scales may be laid off in a horizontal direction as indicated. The scale 1 operates as a base line for my chart.

Substantially at right angles to the clock-time scales, I provide a running-time scale 3 which may be disposed at the left of the chart, and this scale may be provided with divisions corresponding to each two hours and any desired subdivisions, to indicate time consumed in making a run between the terminals. In the present instance the divisions on this scale are numered from two to sixteen.

I now lay off what I term "train lines" 4. These lines are solid black lines which begin at the upper edge of the chart; that is to say, at the zero line of the running time scale 3. These train lines are also located on the clock-time scales 1 and 2 at points corresponding to the time of departure of the train or trains which the lines represent, and the length of each train line indicates the length of time consumed by that train or a certain number of trains leaving at that time on a succession of days. For example, the train line at the extreme left of the chart shows the average running-time for six trains. Incidentally, these trains have an average tonnage of 1704. In this way, I proceed to place on the chart train lines corresponding to all the trains which pass between the two terminals during the day or during a succession of days as may be desired.

According to traffic regulations a time limit of twelve miles and one-half per hour is used for all freight traffic. On this basis I compute the length of time which a train should consume in making the run between the terminals and I then lay off on the chart, a horizontal line 5 which I call a "critical line." In the present instance, the running-time limit between these terminals, figured on this basis, is eleven hours and forty-one minutes; that is to say, this line 5 should be laid off a distance of eleven hours and forty-one minutes on the running-time scale 3.

Having laid off the critical line in this way, I produce a plotted line 6 by connecting up in series, the ends of the train lines 4. In this connection it will be noted that the ends of these lines, in some cases, are disposed above the critical line, and in other cases, below the critical line. In order to bring out the meaning of the chart more graphically to the eye, I shade or cross-section the areas which lie between the critical line 5 and the plotted line or "curve" 6.

In the present instance, it will be noted that the trains may be divided into groups corresponding to "swings" or time periods during which the plotted line lies entirely above or below the critical line; in other words, I divide the trains corresponding to these swings into groups by means of vertical group lines 7. I then compute the average running-time for all the trains in each group. For example, in the group consisting of two train lines at the extreme left end of the chart, one of these train lines represents six trains and the other represents two trains. In computing the average running-time of this group I, of course, give three times as much weight in the calculation to the length of the six-train line as I do to the two-train line. In this way I arrive at an accurate expression of the average running-time for trains of this group. I then place dotted lines 8 on the chart between the adjacent group lines 7 corresponding to each train group; the position of each line is determined by computing the average running time of the trains in the group, and, therefore, the distance of this dotted line from the zero line of the running-time scale corresponds to the average running-time of the trains of the group; for example, in the left hand group,—eleven hours and fifty minutes.

In this way I proceed with all the different train groups and place between the group lines 7 at the end of each group, figures indicating the average running-time for the trains of the group.

It will be evident that the entire chart presents very graphically to the eye, the actual traffic conditions throughout the entire day; for example, the present chart indicates that trains leaving from 8:30 a. m. to 12:30 p. m. have an average running-time of eleven hours and fifteen minutes. This is satisfactory and is within the time limit of eleven hours and forty-one minutes. The chart also indicates that for trains leaving from 7:30 p. m. until 10:30 p. m. the average running-time is too great and these trains consume twelve hours and twenty minutes against a running-time limit of eleven hours and forty-one minutes. The chart also affords means for ascertaining whether trains of a certain group are all acting characteristically or not; for example, in the group of trains leaving between 8:30 a. m. and 12:30 p. m. there is one train line only which extends beyond the critical line. This state of facts indicates graphically an irregularity or condition as regards this train which distinguishes it from the other trains of its group, and in this way, centers the attention of the operating officers etc. of the railway upon this train. Hence, it will be evident that the chart operates to focus the attention of any one studying the chart, upon irregularities, and very clearly shows the characteristic tendencies of the different train groups. It, therefore, affords an admirable opportunity for the study of traffic problems. For example, one of the problems upon which the study of such a chart throws light is the problem of grades, and especially questions as to whether it would be advisable for the railway management to reduce certain present existing or proposed future grades with the idea that the reduced grade might increase the amount of freight which could be carried in the up-grade direction over the line. Such questions have heretofore been decided largely by guess or by judgment based on experience on other lines. In order to decide such a question it is necessary to study the possibility of increasing the ton-mileage at the weakest link or section in the line, that is to say, on the section in which it is at present difficult to maintain the traffic movement at the required figures. For the sake of simplicity suppose that such a "weak" section of the line lies just beyond the grade point under consideration.

If it were desired to study this problem by means of my chart it would be necessary to prepare a chart showing traffic conditions assuming that the contemplated improvement had been made; this chart would be made to cover the line between two points including "weak" section. By preparing an accurate chart of the traffic conditions between these points which would pass the grade in the up-grade direction, it would be possible to ascertain the limit of ton-mileage which could be carried between, these two points in the allowable time. Under present conditions such allowable time is based on an eight hour day and a hundred mile run each day. If the proposed reduction in grade would have the effect of increasing the amount of traffic to be handled on this "weak" section, to a degree beyond its capacity, it is obvious that it would not be good engineering to carry through the project of reducing the grade.

The above illustration is given merely by way of example and it should be understood that there is a very great variety of conditions affecting freight traffic and on almost every line there are points which may be likened to the neck of a bottle where there is a tendency for the traffic to become choked. Such a condition arises frequently at tunnels, railway crossings, at bridges or stations, etc. My special charts would afford opportunity for studying special problems in a simple and graphic manner, and general charts would enable the general effects on the traffic of the sum of all these controlling conditions, to be observed.

Although in my claims I refer simply to the train lines as though each train line represented a single train, it should be understood that each train line may represent, and in practice probably would represent the average of a number of trains departing at the same time on different days. In the chart illustrated most of the train lines correspond to two, three, six or even a greater number of trains. However, where a single line represents a number of trains, it is necessary to bear in mind that a corresponding weight or value must be given in all computations based on the length of the train line.

Adjacent to each train line I provide a legend on the chart indicating the number of trains that the train line represents and also the average tonnage of the trains. These tonnage figures when read in connection with the characteristics of the train line give a clear understanding of the train traffic conditions existing on the line and indicate clearly what effect the tonnage of the trains seems to have upon the running time.

What I claim is:—

1. A chart for graphically indicating traffic conditions between two points for an allowable running time, comprising a time scale indicating divisions of clock-time, a running-time scale extending subsantially at right angles to the clock-time scale for indicating time consumed by trains in their runs between the two points, a plurality of train-lines representing trains, extending substantially parallel with the running-time scale and located at predetermined points on the clock-time scale corresponding to the time of departure of the trains represented, each of said train-lines having a length corresponding to the time consumed in the run by the train or trains it represents, a critical line on the chart substantially parallel with the clock-time scale and located at a predetermined point on the running-time scale to indicate a predetermined limit of time premitted for the run between the two points.

2. A chart for graphically indicating traffic conditions between two points for an allowable running-time, comprising a time-scale indicating divisions of clock-time, a running-time scale extending substantially at right angles to the clock-time scale for indicating time consumed by trains in their runs between the two points, a plurality of train-lines representing trains, extending substantially parallel with the running-time scale and located at predetermined points on the clock-time scale corresponding to the time of departure of the trains represented, each of said train-lines having a length corresponding to the time consumed in the run by the train or trains it represents, a critical line on the chart substantially parallel with the clock-time scale and located at a predetermined point on the running-time scale to indicate a predetermined limit of time permitted for the run between the two points, and means on the scale for indicating the relation of the outer ends of the train lines to the critical line.

3. A chart for graphically indicating traffic conditions between two points for an allowable running-time, comprising a time scale indicating divisions of clock-time, a running-time scale extending substantially at right angles to the clock-time scale for indicating time consumed by trains in their runs between the two points, a plurality of train-lines representing trains, extending substantially parallel with the running-time scale and located at predetermined points on the clock-time scale corresponding to the time of departure of the trains represented, each of said train-lines having a length corresponding to the time consumed in its run by the train it represents, a critical line on the chart substantially parallel with the clock-time scale and located at a predetermined point on the running-time scale to indicate a predetermined limit of time permitted for the run between the two points, a plotted line connecting the ends of the train-lines and having intersections with the critical line where the train-lines change their character with relation to the critical line, the plotted line between adjacent points of intersections operating to indicate characteristic "swings" or time periods during which the train lines have the same characteristic as regards the critical line, and numbers disposed at intervals along the plotted line indicating the average time consumed in a run by groups of the trains represented by the train lines.

4. A chart for graphically indicating traffic conditions between two points for an allowable running time, consisting of a time-scale indicating divisions of the time of day, a running-time scale extending substantially at right angles to the clock-time scale for indicating time consumed by trains in their runs between the two points, a plurality of train-lines representing trains, extending substantially parallel with the running-time scale and located at predetermined points on the clock-time scale corresponding to the time of departure of the trains represented, each of said train-lines having a length corresponding to the time consumed in its run by the train it represents, a critical line on the chart substantially parallel with the clock-time scale and located at a predetermined point on the running-time scale to indicate a predetermined limit of time permitted for the run between the two points, a plotted line connecting the ends of the train-lines and having intersections with the critical line where the train-lines change their character with relation to the critical line, the areas between the plotted line and the critical line being shaded to indicate characteristic "swings" or time-periods during which the train-lines have the same characteristic as regards the critical line, group lines on the chart substantially parallel with the train lines and dividing the train-lines into groups, the members of which have substantially the same characteristics, and numbers disposed between the group lines and indicating the average time consumed in a run by the trains of the corresponding group.

5. A chart for graphically indicating traffic conditions between two points for an allowable running time, comprising a clock-time scale indicating divisions of clock-time, a running time scale extending substantially at right angles to the clock-time scale for indicating time consumed by trains in their runs between the two points, a plurality of train lines representing trains extending substantially parallel with the running time scale and located at predetermined points on the clock-time scale corresponding to the time of departure of the trains represented, each of said train lines having a length corresponding to the time consumed in its or their run by the train or trains it represents, and a legend corresponding to and adjacent to each train line indicating the tonnage carried by the train it represents.

6. A chart for graphically indicating traffic conditions between two points for an allowable running time, consisting of a clock-time scale operating as a base line, and indicating divisions of clock-time, a running-time scale extending substantially at right angles to the clock-time scale for indicating time consumed by trains in their runs between the two points, said chart having indicated points corresponding respectively to trains, and located opposite places on the time-scale that correspond to the time of departure of the different trains, and a critical line on the chart substantially parallel with the time scale and indicating the time allowed the trains for making a run between the two points, the said measured points operating to indicate the characteristic performance of the trains.

7. The method of charting traffic conditions of trains between two points for an allowable running-time which consists in laying off a series of points by measurements from a given line at intervals corresponding to the times of departure of the various trains, giving each of said measurements a length corresponding to the time consumed by each train or trains in making the trip relative to a critical time limit line and thereby indicating conditions of running of the different trains with reference to the critical time.

8. The method of charting the running time of trains between two points for an allowable running time which consists in projecting a series of parallel lines from a given line at intervals corresponding to the times of departure of the various trains during each period, giving each of said lines a length corresponding to the time consumed by each train or trains in making the trip, and relative to a critical time-limit line, connecting the ends of said parallel lines by a plotted line, thereby delimiting areas representing abnormal conditions of running as respects the critical time, and indicating the average running time of the trains embraced in one or more of said delimited areas.

9. The method of charting the running time of trains between two points for an allowable running time which consists in laying off a series of points by measurements from a given line at intervals corresponding to the times of departure of the various trains, giving each of said measurements a length corresponding to the time consumed by each train or trains in making the trip, and relative to a critical time limit line, plotting a line through the measured points thereby delimiting areas representing abnormal conditions of running as respects the critical time, and indicating the average running time of the trains in one or more of said delimited areas.

10. A chart for graphically indicating traffic conditions between two points for an allowable running time comprising a clock-time scale indicating divisions of clock-time, a running time scale extending substantially at right angles to the clock-time scale for indicating time consumed by trains in their runs between the terminals, a plurality of train lines representing trains extending substantially parallel with the running time scale and located at predetermined points on the clock-time scale corresponding to the time of departure of the trains represented, each of said train lines having a length corresponding to the time consumed in its or their run by the train or trains it represents and means for indicating the tonnage carried by the train or trains represented by said train lines.

11. The method of charting traffic conditions between two points for an allowable running time which consists in laying off a series of points by measurements from a given line at intervals corresponding to the times of departure of the various trains, indicating in conjunction with said series of points, the tonnage of the trains corresponding thereto, and giving each of said measurements a length corresponding to the time consumed by each train, or the average time of a number of trains in making the trip relative to a critical time limit line, thereby indicating conditions of running of the different trains with the indicated tonnage with reference to the critical time.

In testimony whereof, I have hereunto set my hand.

BERTRAM H. MANN.